United States Patent [19]

Nakamura et al.

[11] Patent Number: 5,942,581
[45] Date of Patent: *Aug. 24, 1999

[54] LUBRICANT FOR A THERMOPLASTIC RESIN AND A THERMOPLASTIC RESIN COMPOSITION COMPRISING THEREOF

[75] Inventors: Keiji Nakamura; Akira Nakata, both of Otake, Japan

[73] Assignee: Mitsubishi Rayon Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/764,443

[22] Filed: Dec. 12, 1996

[30] Foreign Application Priority Data

Dec. 13, 1995 [JP] Japan ................... 7-324488

[51] Int. Cl.$^6$ ................... C08F 265/04
[52] U.S. Cl. ................... 525/309; 525/85
[58] Field of Search ................... 524/523; 525/216, 525/227, 228, 309, 85

[56] References Cited

U.S. PATENT DOCUMENTS

| | | | |
|---|---|---|---|
| 4,112,023 | 9/1978 | Gore | 525/228 |
| 4,277,573 | 7/1981 | Iizuka | 525/228 |
| 4,536,548 | 8/1985 | Stutzel | 525/227 |
| 4,746,705 | 5/1988 | Courtis | 525/308 |
| 4,849,479 | 7/1989 | Siol | 525/216 |
| 4,892,909 | 1/1990 | Siol | 525/216 |
| 4,912,169 | 3/1990 | Whitmire | 525/227 |
| 5,001,192 | 3/1991 | Sun | 525/227 |
| 5,008,341 | 4/1991 | Bueschl | 525/216 |
| 5,055,529 | 10/1991 | Kishida | 525/227 |
| 5,314,965 | 5/1994 | Kishida | 525/227 |
| 5,331,040 | 7/1994 | Lee | 524/523 |
| 5,442,012 | 8/1995 | Kempner | 525/71 |
| 5,545,457 | 8/1996 | Harder | 524/523 |

*Primary Examiner*—Paul R. Michl
*Attorney, Agent, or Firm*—Oblon, Spivak, McClelland, Maier & Neustadt, P.C.

[57] ABSTRACT

A lubricant for a thermoplastic resin such as poly(vinyl chloride) resin, comprising (co)polymer (A) whose weight-average molecular weight is in the range of 10,000 to 10,000,000, produced by polymerization of (meth)acrylate with a (cyclo)alkyl group having 6 to 24 of carbon atoms and (co)polymer (B) produced by polymerization of (meth) acrylate with an alkyl group having 1 to 4 of carbon atoms whose glass transition temperature is not lower than 15° C.

9 Claims, No Drawings

LUBRICANT FOR A THERMOPLASTIC RESIN AND A THERMOPLASTIC RESIN COMPOSITION COMPRISING THEREOF

BACKGROUND OF THE INVENTION

1. Field of the Invention

This invention relates to a lubricant for a thermoplastic resin and a thermoplastic resin composition comprising thereof.

2. Prior Art

Thermoplastic resins, especially poly(vinyl chloride) resins, are widely used in various fields. In general, a poly(vinyl chloride) resin contains aids such as a lubricant and a processing aid, in order to improve its moldability and processability and to enable it to stably pass through various processes. Polymers such as a copolymer mainly composed of methyl methacrylate have been used as such polymer processing aids or lubricants. For example, JP-B-52-781 discloses a three-stage polymerizing polymer consisting of components of poly(methyl methacrylate)/styrene-(meth)acrylate copolymer/poly(methyl methacrylate); JP-B-52-3668 discloses a two-stage polymerizing polymer consisting of components of poly(methyl methacrylate)/a copolymer of styrene, methacrylate and multifunctional monomer; JP-B-50-37699 discloses a two-stage polymerizing polymer consisting of components of polyacrylate/poly(meth)acrylate, polystyrene or poly(substituted styrene); and JP-A-07-278237 discloses a two-stage polymerizing polymer consisting of components of polyacrylate/methyl methacrylate-vinyl compound copolymer. In addition, JP-A-55-164209 and EP-581009 (U.S. Pat. No. 5,476,906) disclose a copolymer of an acrylate having an alkyl group with at least a particular number of carbon atoms and an acrylate having an alkyl group with below a particular number of carbon atoms.

Neither of the copolymers described above, however, can satisfactorily improve lubricating properties, especially initial lubricating properties, of a lubricant such as delaying melting of a thermoplastic resin, especially poly(vinyl chloride) resin, during processing and its fluidity; reducing a stock pressure required for its molding; releasability from a metal surface of a molding machine; and durability of lubricating properties.

The above processing aids and lubricants are intended to retain transparency of a thermoplastic resin, especially poly(vinyl chloride) resin and improve a long-term durability of lubricating properties such as processability (e.g., drawdown), fluidity during molding, elasticity at an elevated temperature and releasability from a roll surface during calendering, and in terms of these respects they have been successful in some degree.

In the light of improvement of productivity and quality and energy-saving as well as environmental problems, however, conventional lead-containing processing aids which have good lubricant properties have been recently being replaced with non-toxic ones. Furthermore, there exist needs for lubricants having features such as good fluidity during molding of a thermoplastic resin, especially poly(vinyl chloride) resin, a reduced stock pressure required for molding, good initial lubricating properties and its durability, providing a molded product with a good luster and transparency. Given such a situation, the above processing aids and lubricants do not satisfactorily meet these needs. In addition, lubricants should have excellent powder properties, especially untiblocking, which neither of the above materials meet.

SUMMARY OF THE INVENTION

An object of the present invention is to solve the above problems. In other words, it is to provide a lubricant effective for a thermoplastic resin, especially for poly(vinyl chloride) resin, which has features such as a reduced stock pressure required during molding, good initial lubricating properties (delaying melting of a resin etc.), good durability of lubricating properties, good fluidity, good releasability from a metal surface of a molding machine, retaining a feature of good transparency in a molded product, excellent handling properties; and a thermoplastic resin composition comprising thereof.

The present inventors have intensively investigated to solve the above problems, and have found that a resin composition comprising (co)polymer (A) prepared from a (meth)acrylate with a (cyclo)alkyl group having a particular number of carbon atoms and (co)polymer (B) prepared from (meth)acrylate with an alkyl group having a particular number of carbon atoms, is an excellent lubricant for a thermoplastic resin as powders, which is excellent in delaying melting of a resin during molding, releasability from a metal surface after the resin has melted and its durability, fluidity and handling properties.

In other words, the present invention provides a lubricant for a thermoplastic resin, which is a resin composition comprising (co)polymer (A) whose weight-average molecular weight measured using gel-permeation chromatography is in the range of 10,000 to 10,000,000, prepared by polymerization of a (meth)acrylate with a (cyclo)alkyl group having 6 to 24 of carbon atoms and (co)polymer (B) prepared by polymerization of (meth)acrylate with an alkyl group having 1 to 4 of carbon atoms whose glass transition temperature is not lower than 15° C.

The present invention also provides a thermoplastic resin composition comprising the above lubricant and a thermoplastic resin.

DETAILED DESCRIPTION OF THE PREFERRED EMBODIMENTS

A lubricant for a thermoplastic resin of the present invention is a resin composition comprising (co)polymer (A) prepared by polymerization of a (meth)acrylate with a (cyclo)alkyl group having 6 to 24 of carbon atoms and (co)polymer (B) prepared by polymerization of a (meth)acrylate with an alkyl group having 1 to 4 of carbon atoms.

A monomer of (meth)acrylate with an alkyl group having 6 to 24 of carbon atoms for preparation of (co)polymer (A) may be straight, branched or cyclic in its alkyl group. Specifically, those with a straight alkyl include methacrylates such as octyl methacrylate, lauryl methacrylate, tridecyl methacrylate and stearyl methacrylate; and acrylates such as lauryl acrylate and stearyl acrylate. Those with a branched alkyl include 2-ethylhexyl methacrylate and 2-ethylhexyl acrylate. Those with a cyclic alkyl include cyclohexyl methacrylate and cyclohexyl acrylate. The present invention is, however, not limited to these examples. (Meth)acrylates with a (cyclo)alkyl group having 6 to 24 of carbon atoms may be used solely or in combination.

In terms of the present invention, for attaining excellent lubricating properties it is preferable to use (meth)acrylate with a straight or branched alkyl group having 6 to 24 of carbon atoms, more preferably acrylate with a straight or branched alkyl group having 12 to 24 of carbon atoms.

Those deviating from the above limitations, for example, (meth)acrylate having an alkyl with less than 6 of carbon atoms, are not preferable because they do not achieve desired effects such as reducing a stock pressure during molding or improving initial lubricating properties and releasability from a metal surface and its durability. A (meth)acrylate with an alkyl group having over 24 of carbon atoms is also not preferable because it is difficult to form a polymer due to reduction of polymerization ability of the monomer or a mixture thereof.

Components for copolymerization for (co)polymer (A) may include (meth)acrylates other than those with a (cyclo) alkyl having 6 to 24 of carbon atoms, aromatic alkenyl compounds and cyano-vinyl compounds. The (meth) acrylates other than those with a (cyclo)alkyl having 6 to 24 of carbon atoms include methyl (meth)acrylate, ethyl (meth) acrylate and butyl acrylate. The aromatic alkenyl compounds include styrene, α-methylstyrene and vinyltoluene. The cyano-vinyl compounds include acrylonitrile and methacrylonitrile.

(Co)polymer (A) contains preferably at least 50% by weight, more preferably at least 70% by weight of (meth) acrylate with a (cyclo)alkyl group with 6 to 24 of carbon atoms.

(Co)polymer (A) is required to have at least 10,000, preferably at least 30,000, more preferably at least 50,000 of weight-average molecular weight measured by gel permeation chromatography. (Co)polymer (A) preferably has at least 0° C. of brittle temperature measured by differential scanning calorimetry. One whose weight-average molecular weight is less than 10,000 are not desirable because it does not have desired effects such as reducing a stock pressure during processing, good initial lubricating properties and releasability from a metal surface and its durability, and because it is difficult to collect it as powders.

(Meth)acrylates with an alkyl having 1 to 4 of carbon atoms which can be used for preparation of (co)polymer (B) include methacrylates such as methyl methacrylate, ethyl methacrylate and butyl methacrylate; and acrylates such as methyl acrylate and ethyl acrylate, which can be used solely or in combination.

In addition to acrylates with an alkyl having 1 to 4 of carbon atoms, vinyl compounds which can copolymerizes with the acrylates may also be used as component(s) for copolymerization for preparation of (co)polymer (B). Such vinyl compounds include aromatic vinyl and cyano-vinyl compounds. Aromatic vinyl compounds include styrene; and α-substituted styrenes and ring-substituted styrenes, for example, α-methylstyrene, chlorostyrene and vinyltoluene. Cyano-vinyl compounds include acrylonitrile and methacrylonitrile. The present invention is, however, not limited to these specific examples. When (meth)acrylate with a (cyclo) alkyl having 6 to 24 of carbon atoms is used as a vinyl compound, its content should be less than 10% by weight. These vinyl compounds may be used solely or in combination.

Co-polymer (B) in the present invention should have at least 15° C., preferably at least 25° C. of glass transition temperature, and a combination of monomers or monomer mixture shall be selected to achieve it.

When a glass transition temperature of (co)polymer (B) is lower than 15° C., it is difficult to obtain a lubricant of the present invention as powders with good handling properties.

(Co)polymer (B) contains preferably at least 30% by weight, more preferably at least 45% by weight to achieve better effects, of (meth)acrylate with an alkyl having 1 to 4 of carbon atoms. When (co)polymer (B) which contains less than 30% by weight of (meth)acrylate with an alkyl having 1 to 4 of carbon atoms, it is difficult to achieve effects as objects of this invention such as good initial lubricating properties (delaying melting of a resin etc.) giving excellent powders having good handling properties with retaining good characteristics in releasability from a metal surface and its durability and in fluidity; and it may often impair transparency of a resulting thermoplastic resin.

A lubricant for a thermoplastic resin of this invention is a mixed resin comprising (co)polymer (A) and (co)polymer (B), in which there exists no copolymerization between components of (co)polymer (A) and of (co)polymer (B).

Before blended into a thermoplastic resin as a matrix, a lubricant for a thermoplastic resin of this invention exists as a powdery composition with good handling properties, comprising a mixture of (co)polymer (A) and (co)polymer (B). After blending into the resin, these (co)polymers independently act, i.e., (co)polymer (A) acts as a lubricating component, whereas (co)polymer (B) is quickly absorbed by the thermoplastic resin.

If components of (co)polymer (A) and of (co)polymer (B) are copolymerized, therefore, it is undesirable because it is difficult to achieve effects as objects of this invention such as good initial lubricating properties (delaying melting of a resin etc.) good releasability from a metal surface and its durability and good fluidity.

Depending on selection of copolymerization components for each (co)polymer, it may result in that a main component of (co)polymer (B) is also contained in (co)polymer (A) or a main component of (co)polymer (A) is also contained in (co)polymer (B). Further, depending on a polymerization process and preparation conditions, it may occur that monomers in a first polymerization reaction remain unreacted, which involve in the next polymerization, resulting in partially forming copolymer(s) of components of (co)polymer (A) and (co)polymer (B). It, however, may be acceptable that one (co)polymer contains a main component of the other (co)polymer within a range where it does not impair the characteristics, i.e., good initial lubricating properties (delaying melting of a resin etc.), good releasability from a metal surface and its durability, good fluidity and powders with good handling properties.

Content of (co)polymer (A) in a lubricant for a thermoplastic resin of this invention is 50 to 99.9% by weight, preferably 60 to 99% by weight, more preferably 60 to 85% by weight to achieve better effects. A lubricant containing (co)polymer (A) at less than 50% by weight may not exhibit desired effects such as reducing a stock pressure during processing, good initial lubricating properties, durability of lubricating properties and good releasability from a metal surface. A lubricant containing (co)polymer (B) at less than 0.1% by weight has reduced blocking resistance, and cannot be produced as powders with good handling properties.

Components of (co)polymer (A) and (co)polymer (B) for a lubricant for a thermoplastic resin of the present invention may be combined as a common mixture; in a manner that one's components are adsorbed over the other's components; or in a manner that one's components are encapsulated in a capsule of the other's components. To achieve better effects of the present invention, they are combined in a manner that (co)polymer (B) is adsorbed over (co)polymer (A) or that (co)polymer (A) is encapsulated in a capsule of (co)polymer (B).

A lubricant of the present invention can be readily formed to polymerize monomer components for an individual copolymer. Polymerization methods which may be applied include emulsion polymerization, suspension polymerization and solution polymerization, preferably emulsion polymerization and suspension polymerization, more preferably emulsion polymerization.

Well-known emulsifiers may be used in a preparation process applying emulsion polymerization, for example, anionic surfactants such as fatty acid salts, alkyl sulfates, alkyl benzene sulfonates, alkyl phosphates and dialkylsulfosuccinates; nonionic surfactants such as polyoxyethylene alkyl ethers, fatty acid polyoxyethylene esters, fatty acid sorbitan esters and fatty acid glycerin esters; cationic surfactants such as alkylamine salts. These emulsifiers may be used solely or in combination.

Polymerization initiators which may be used include single types of water- or oil-soluble ones, or redox types; for example, an initiator such as a normal persulfate may use solely or, as a redox initiator, in combination with, e.g., a sulfite, a bisulfite or a thiosulfate. Organic peroxides such as t-butylhydroperoxide, cumene hydroperoxide, benzoyl peroxide and lauroyl peroxide or azo compounds may be used solely or, as a redox initiator, in combination with, e.g., sodium formaldehyde sulfoxylate. This invention is, however, not limited to these specific examples.

A specific polymerization procedure to prepare a lubricant of the present invention is preferably a two-stage polymerization, i.e., first, (co)polymer (A) is prepared by, e.g., an emulsion polymerization and next, in the presence of the resulting (co)polymer (A), monomers for (co)polymer (B) are polymerized.

The resulting (co)polymer (A) and (co)polymer (B) can be collected using a well-known procedure; e.g., when they are prepared by emulsion polymerization, a latex of (co) polymers is spray-dried or freezed-dried, or salt-coagulation out or acid-coagulation to form precipitate of copolymers, which are then separated, washed and dried to be collected as powders.

A lubricant of this invention thus obtained is blended in a thermoplastic resin. A lubricant can be blended in a thermoplastic resin by a well-known blending method, e.g., blending with Henschel mixer, a ribbon mixer or a V-shape mixer. After mixed with, e.g., a mixing roll or a banbury mixer, the blend is molded with an extrusion or injection molding machine.

A thermoplastic resin in which a lubricant for a thermoplastic resin of this invention may be blended is, but not limited to, preferably a poly(vinyl chloride) resin, e.g., a homopolymer of vinyl chloride, a postchlorinated poly(vinyl chloride), a partially-bridged poly(vinyl chloride), a copolymer of vinyl chloride with another vinyl compound contained by up to 30% by weight, which is copolymerizable with vinyl chloride, and a mixture thereof. Other vinyl compounds copolymerizable with vinyl chloride include, but not limited to, fatty acid vinyl esters such as vinyl acetate and vinyl propionate; alkyl methacrylates such as methyl methacrylate and ethyl methacrylate; α-olefins such as ethylene and propylene; alkyl vinyl ethers such as vinyl methyl ether and vinyl butyl ether; and unsaturated carboxylic acids or their anhydrides such as acrylic acid, methacrylic acid and maleic anhydride, which may be used solely or in combination. A copolymer with the copolymerizable vinyl compound over 30% by weight is not preferable because it will impair intrinsic characteristics of poly(vinyl chloride) resin. Further, these poly(vinyl chloride) resins may be used solely or in combination.

Average degree of polymerization of a poly(vinyl chloride) resin is preferably in the range of 300 to 5,000, more preferably 500 to 3000. The resin with less than 300 of average degree of polymerization does not have adequate strength, and one with over 5,000 tends to be inadequately mixed, resulting in its reduced processability.

Preparation methods which may be used for a poly(vinyl chloride) resin include, but not limited to, various well-known techniques such as emulsion polymerization, suspension polymerization and bulk polymerization.

In addition to the above poly(vinyl chloride) resins, a lubricant of this invention may be blended in other thermoplastic resins such as polyolefin resins, e.g., polyethylene, polypropylene and polyethylene-polypropylene copolymer resins; polystyrene resins; ABS resins; acrylonitrile-styrene copolymer resins; poly(meth)acrylate resins; polyester resins; polycarbonate resins; polyfluorovinyl resins; and blends thereof, but thermoplastic resins in which a lubricant of this invention may be blended are not limited to the specific examples.

Blending content of a lubricant is, but not limited to, preferably 0.05 to 10 parts by weight to 100 parts by weight of a thermoplastic resin, more preferably 0.05 to 5 parts by weight, in order to achieve better effects. A resin with less than 0.05 parts by weight of a lubricant has inadequate lubricating properties, and one with over 10 parts by weight undesirably impairs intrinsic mechanical properties of a resin.

Depending on its use, a lubricant of this invention may be blended in a thermoplastic resin, in combination with, e.g., well-known plasticizers, processing aids, colorants, foaming agents, stabilizers, fillers, lubricants, mold lubricants, impact-modifier, thermal-resistance improving agents, flame retardants, anti-clouding agents, antimicrobiotics, antistatic agents and/or surfactants, if they do not impair effects of a lubricant of this invention.

The stabilizers include lead stabilizers such as tribasic lead sulfate, dibasic lead phosphite, basic lead sulfite, lead silicate; metal soap stabilizers derived from a metal, e.g., potassium, magnesium, barium, zinc, cadmium, lead, etc. and a fatty acid, e.g., 2-ethylhexanoic acid, lauric acid, myristic acid, palmitic acid, stearic acid, isostearic acid, hydroxystearic acid, oleic acid, ricinolic acid, linoleic acid, behenic acid, etc.; organotin stabilizers derived from a fatty acid salt, a maleic acid salt or a sulfur-containing compound and an alkyl or ester group; composite metal-soap stabilizers such as Ba—Zn, Ca—Zn, Ba—Ca—Sn, Ca—Mg—Sn, Ca—Zn—Sn, Pb—Sn and Pb—Ba—Ca types; metal-salt stabilizers derived from a metal, e.g., barium and zinc, and normally at least two of organic acids such as branched fatty acids (e.g., 2-ethylhexanoic acid, isodecanoic acid and trialkylacetic acids), unsaturated fatty acids (e.g., oleic acid, ricinolic acid and linoleic acid), cycloaliphatic acids (e.g., naphthenic acid), aromatic acids (e.g., phenol, benzoic acid, salicylic acid and their substituted derivatives); metal stabilizers such as liquefied metal-salt stabilizers comprising any of the above stabilizers dissolved in petroleum hydrocarbon (s), an alcohol and a glycerin derivative, and stabilizing aids, e.g., phosphites, epoxy compounds, anti-coloring agents, transparency improving agents, photostabilizers, antioxidants, anti-plateout agents and lubricants; epoxy compounds, e.g., polyexopy resins, epoxidized soybean oil, epoxidized vegetable oils and epoxidized fatty acid alkyl esters; non-metallic stabilizers such as organic phosphites which, on its phosphorus atom, have substituent(s) such alkyl, aryl, cycloalkyl or alkoxy groups, containing a dihydric alcohol, e.g., propylene glycol and an aromatic compound, e.g., hydroquinone and bisphenol A, which are used solely or in combination.

Fillers include inorganic materials such as carbonates, e.g., heavy calcium carbonate, precipitated calcium carbonate, gluey calcium carbonate, aluminum hydroxide, magnesium hydroxide, titanium dioxide, clay, mica, talc, warastnite, zeolite, silica, zinc oxide, magnesium oxide, carbon black, graphite, glass beads, glass fiber, carbon fiber, metal fiber; and also organic materials such as wood powders and polyamide fiber, which may be used solely or in combination.

Lubricants include pure hydrocarbons such as liquid paraffin, natural paraffin, microwax, synthetic paraffin and low molecular weight polyethylene; halogenated hydrocarbons; fatty acids such as higher fatty acids and oxyfatty acids; fatty acid amides such as fatty acid amides and bisfatty acid amides; esters such as fatty acid polyhydric alcohol esters, e.g., fatty acid lower alcohol esters and glyceride, fatty acid polygycol esters and fatty acid aliphatic alcohol esters (ester wax); metal soaps; fatty alcohols; polyhidric alcohols; polyglycols; polyglycelols; partial esters of a fatty acid with a polyhydric alcohol; partial esters of a fatty acid with a polyglycol or a polyglycelol.

In addition, fusion accelerator such as poly(ethyl methacrylate) copolymers; flame retardants such as chlorinated paraffins, aluminium hydroxide, antimony trioxide and halogen compounds; fluidity improving agents; colorants; and foaming agents can be optionally blended depending on the use of the lubricant, if they do not impair effects of the lubricant of this invention.

Impact modifier include polybutadiene, polyisoprene, polychloroprene, fluororubber, styrene-butadiene copolymer rubber, acrylonitrile-styrene-butadiene copolymer rubber, styrene-butadinene-styrene block copolymer rubber, styrene-isoprene-styrene block copolymer rubber, styrene-ethylene-butylene-styrene block copolymer rubber, ethylene-propylene copolymer rubber, ethylene-propylene-diene copolymer rubber(EPDM), silicone-containing acrylate rubber, silicone/acrylate composite-rubber graft copolymer and silicone rubber. Dienes for EPDM include 1,4-hexadiene, dicyclopentadiene, methylenenorbornene, ethylidenenorbornene and propenylnorbornene. These impact modifier may be used solely or in combination.

Thus, materials which can be used in combination with a lubricant for a thermoplastic resin of this invention have been described, but this invention is not limited to these specific examples.

A thermoplastic resin composition obtained may be applied, but not limited to, in a common well-known molding process, e.g., injection molding, hollow molding, extrusion molding, compression molding and calender molding, preferably extrusion molding, to provide various molded products.

EXAMPLES

Here, this invention will be specifically illustrated with Examples and Comparative Examples, but is not limited to them. In the following description, expressions "part(s)" and "%" indicate "part(s) by weight" and "% by weight", respectively. The following evaluations were conducted to demonstrate distinguised effects of a lubricant for a thermoplastic resin of this invention, whose results are shown in Table 1.

(1) Initial Lubricating Properties

Initial lubricating properties were evaluated based on gelling characteristics of a thermoplastic resin composition. In Table 1 are shown a maximum torque, Mmax(Nm), measured with Brabender Plasticorder (PL-2000 Type, mixer type) under the condition of 5 minutes of preheating, and time, Tmax(seconds), taken to reach the maximum torque. The resin compositions for evaluation of the initial lubricating properties were the following 3 blends.

(Blend 1)

To 100 parts of poly(vinyl chloride) resin with 1100 of average degree of polymerization were added 1.5 parts of dioctyltin mercaptide and 1.0 part of calcium stearate, and the mixture was mixed with Henschel mixer to raise a resin temperature to 115° C. After the mixture was cooled to room temperature, to the resulting blend was added 0.5 parts of a lubricant obtained in one of Examples and Comparative Examples, and the mixture was blended to prepare a pol (vinyl chloride) resin composition.

(Blend 2)

To 100 parts of poly(vinyl chloride) resin with 1100 of average degree of polymerization were added 1.5 parts of dioctyltin mercaptide, 1.0 part of calcium stearate and 5.0 parts of calcium carbonate, and the mixture was mixed with Henschel mixer to raise a resin temperature to 115° C. After the mixture was cooled to room temperature, to the resulting blend was added 0.5 parts of a lubricant obtained in one of Examples and Comparative Examples, and the mixture was blended to prepare a pol(vinyl chloride) resin composition.

(Blend 3)

To 100 parts of poly(vinyl chloride) resin with 1100 of average degree of polymerization were added 1.5 parts of dioctyltin mercaptide, 1.0 part of calcium stearate and 7.0 parts of Metabren C-323A (manufactured by Mitsubishi Rayon Co., Ltd,), and the mixture was mixed with Henschel mixer to raise a resin temperature to 115° C. After the mixture was cooled to room temperature; to the resulting blend was added 0.5 parts of a lubricant obtained in one of Examples and Comparative Examples; and the mixture was blended to prepare a poly(vinyl chloride) resin composition.

(2) Durability of Lubricating Properties

Durability of lubricating properties were evaluated based on a sticking time of a resin composition. Hundred grams of sample was blended with Kansai Roll Laboratory Mill (6 inches) under the following conditions; 205° C. of front-roll temperature, 201° C. of rear-roll temperature and rotation rates of 16 rpm for the front-roll and 14 rpm for the rear-roll, while the resin composition was released from the roll every 30 seconds. The elapsed time until the composition finally became unreleasable is shown as its sticking time(minutes) in Table 1. The resin composition for evaluation of the durability of lubricating properties was prepared as follows. To 100 parts of poly(vinyl chloride) resin with 800 of average degree of polymerization were added 1.0 part of Metabren P-550A (manufactured by Mitsubishi Rayon Co., Ltd.), 5.0 parts of Metabren C-201 (manufactured by Mitsubishi Rayon Co., Ltd.), 0.9 parts of Roxyol G-16 (manufactured by Henkel Hakusui Co.) and 2.0 parts of T-17MJ (manufactured by Katsuta Kako Co.); the mixture was mixed to raise a resin temperature to 115° C. using Henschel mixer, which was then cooled to room temperature; to the resulting blend was added 0.2 parts of a lubricant obtained in one of Examples and Comparative Examples; and the mixture was blended with Henschel mixer to prepare a poly(vinyl chloride) resin composition.

(3) Blocking Resistance

In a cylindrical vessel was placed 10 g of resin powders, which was then pressurized under 175 kg/cm$^2$ at 40° C. The resulting block was vibrated with Micro Type Electromagnetic Vibration Sieving Machine (manufactured by Tsutsui Rika Co.) to measure the elapsed time(seconds) until the block was broken by 60%. Measurement was continued for maximum 30 minuites, and for the sample not broken at that time "not broken" is noted. The results obtained is shown in Table 1.

Example 1

In a reaction vessel were placed 150 parts of ion-exchage water in which dissolved oxygen had been repelled with nitrogen, 1.5 parts of sodium dialkylsulfosuccinate as an emulsifier and 97 parts of stearyl methacrylate as a component for polymer (A) which had been pre-dispersed with a homo-mixer and then forced-emulsified with a homogenizer. Then, after gas in the reaction vessel was replaced with nitrogen with stirring, 0.01 parts of tertbutyl hydroperoxide was added to the mixture, which was then heated to 70° C. and to which were added ferrous sulfate at 10 ppm, disodium ethylenediamine-tetraacetate at 30 ppm, 0.2 parts of sodium sulfoxylic acid-formaldehyde. The mixture was heated with stirring for 4 hours at the same temperature, to initiate polymerization to give a polymer with a conversion of at least 99.9%. In 3 parts of methyl methacrylate as a component of polymer (B) was dissolved 0.1 parts of tert-butyl hydroperoxide, and the mixture was bubbled with nitrogen for 30 minutes. The mixture was dropped over 60 minutes into the above reaction mixture maintained at 70° C. in the presence of polymer (A), and the resulting mixture was heated with stirring at the same temperature for 2 hours to initiate seed polymerization to give a resin composition consisting of 97 parts of polymer (A) and 3 parts of polymer (B). The polymer latex obtained was solidified with sulfuric acid to give a slurry, which was then dried, washed with pure water and dried to give polymer powders. Then the powders were sieved and those which passed through a #20 mesh sieve were used to give a resin composition for evaluation and each evaluation test was conducted. The results are shown in Table 1.

Example 2

The procedure as described in Example 1 was carried out, except that 70 parts of stearyl methacrylate as a component for polymer (A) and 30 parts of methyl methacrylate as a component for polymer (B) were used, to give a resin composition consisting of 70 parts of polymer (A) and 30 parts of polymer (B). According to the similar procedure to Example 1, a resin composition for evaluation was obtained, with which each evaluation test was conducted. The results are shown in Table 1.

Example 3

The procedure as described in Example 1 was carried out, except that a mixture of 65 parts of stearyl methacrylate and 15 parts of methyl methacrylate as components for polymer (A) and 20 parts of methyl methacrylate as a component for polymer (B) were used, to give a resin composition consisting of 80 parts of polymer (A) and 20 parts of polymer (B). According to the similar procedure to Example 1, a resin composition for evaluation was obtained, with which each evaluation test was conducted. The results are shown in Table 1.

Example 4

The procedure as described in Example 1 was carried out, except that 70 parts of lauryl methacrylate as a component for polymer (A) and 30 parts of methyl methacrylate as a component for polymer (B) were used, to give a resin composition consisting of 70 parts of polymer (A) and 30 parts of polymer (B). According to the similar procedure to Example 1, a resin composition for evaluation was obtained, with which each evaluation test was conducted. The results are shown in Table 1.

Comparative Example 1

The procedure as described in Example 1 was carried out, except that 100 parts of stearyl methacrylate as a component for polymer (A) was used without a component for polymer (B),i.e., without a process for polymer (B), to give a resin composition consisting of polymer (A). According to the similar procedure to Example 1, a resin composition for evaluation was obtained, with which each evaluation test was conducted. The results are shown in Table 1.

Comparative Example 2

The procedure as described in Example 1 was carried out, except that 70 parts of n-butyl acrylate as a component for polymer (A) and 30 parts of methyl methacrylate as a component for polymer (B) were used, to give a resin composition consisting of 70 parts of polymer (A) and 30 parts of polymer (B). According to the similar procedure to Example 1, a resin composition for evaluation was obtained, with which each evaluation test was conducted. The results are shown in Table 1.

Comparative Example 3

With a predetermined amount of commercially available lubricant, Hi-wax 220P (manufactured by Mitsui Petrochemical Industries, Ltd.), an evaluation similar to Example 1 was conducted. The results are shown in Table 1.

Comparative Example 4

With a predetermined amount of commercially available lubricant, Hi-wax 220MP (manufactured by Mitsui Petrochemical Industries, Ltd.), an evaluation similar to Example 1 was conducted. The results are shown in Table 1.

Comparative Example 5

An evaluation similar to Example 1 was conducted without addition of a lubricant. The results are shown in Table 1.

When blended in various thermoplastic resins, a lubricant for a thermoplastic resin of this invention exhibits superior effects such as reduction of a stock pressure during molding, e.g., extrusion, without imparing transparency of the resin; delaying melting of the resin; fluidity; and releasability from a metal surface of a molding machine, to any of the conventional lubricants. In addition, it is powders with good handling properties, which can significanly improve productivity and can be produced with less energy. Hence, industrially it is tremendously valuable.

TABLE 1

| | Lubricant components | | | | Weight-average molecular weight of polymer (A)*5 Mw × $10^4$ | Initial lubricating properties | | | | | | Durability of lubricating properties Sticking Time (min.) | Blocking resistance (sec.) |
| | | | | | | Blend 1 | | Blend 2 | | Blend 3 | | | |
| | Monomer composition of polymer (A) | Contents (Parts) | Monomer composition of polymer (B) | Contents (Parts) | | Maximum torque Mmax (Nm) | Gelling time Tmax (sec.) | Maximum torque Mmax (Nm) | Gelling time Tmax (sec.) | Maximum torque Mmax (Nm) | Gelling time Tmax (sec.) | | |
|---|---|---|---|---|---|---|---|---|---|---|---|---|---|
| Example 1 | SMA *1 | 97 | MMA *2 | 3 | 160 | 41.4 | 228 | 42.4 | 194 | 39.3 | 504 | 15.0 | 60 |
| Example 2 | SMA *1 | 70 | MMA *2 | 30 | 150 | 43.0 | 116 | 45.6 | 120 | 45.7 | 306 | 16.0 | 41 |
| Example 3 | SMA *1 MMA *2 | 65 15 | MMA *2 | 20 | 160 | 44.8 | 105 | 47.6 | 110 | 47.0 | 285 | 17.5 | 35 |
| Example 4 | LMA *3 | 70 | MMA *2 | 30 | 140 | 43.8 | 117 | 47.1 | 112 | 46.1 | 300 | 16.5 | 72 |
| Comp. Ex. 1 | SHA*1 | 100 | — | — | 160 | 43.0 | 200 | 45.0 | 190 | 40.1 | 490 | 15.0 | Not broken |
| Comp. Ex. 2 | n-BA*4 | 70 | MMA *2 | 30 | 160 | 61.0 | 39 | 65.0 | 35 | 70.1 | 42 | 15.0 | 102 |
| Comp. Ex. 3 | Hiwax220P | 100 | — | — | — | 55.8 | 40 | 59.2 | 30 | 71.1 | 12 | 5.0 | 40 |
| Comp. Ex. 4 | Hiwax-220MP | 100 | — | — | — | 53.7 | 42 | 57.9 | 30 | 66.5 | 10 | 6.0 | 38 |
| Comp. Ex. 5 | Blank | — | — | — | — | 81.1 | 6 | 87.5 | 6 | 87.6 | 6 | 1.5 | — |

Notes
*1 Stearyl methacrylate monomer
*2 Methyl methacrylate monomer
*3 Lauryl methacrylate monomer
*4 n-Butyl acrylate monomer
*5 Calculated in terms of poly(methyl methacrylate)

What is claimed is:

1. A lubricant for a thermoplastic resin, comprising a powdery polymer product obtained by polymerizing 50 to 0.1 parts by weight of a monomer or monomer mixture composed of the monomeric components of a (co)polymer (B) containing at least 45% by weight of a (co)polymerized alkyl(meth)acrylate, where the alkyl group has 1 to 4 carbon atoms, having a glass transition temperature of not lower than 15° C., in the presence of 50 to 99.1 parts by weight of a (co)polymer (A) whose weight-average molecular weight measured using gel-permeation chromatography is in the range of 50,000 to 10,000,000, produced by polymerization of a monomer or monomer mixture containing at least 70% by weight of an alkyl(meth)acrylate with a straight or branched alkyl group having 12 to 24 carbon atoms to obtain a polymer product containing (co)polymer (A) and (co)polymer (B) and collecting the powdery polymer product.

2. A lubricant for a thermoplastic resin according to claim 1, comprising 60 to 99 parts by weight of (co)polymer (A) and 40 to 1 parts by weight of (co)polymer (B).

3. A lubricant for a thermoplastic resin according to claim 1, comprising 60 to 85 parts by weight of (co)polymer (A) and 40 to 15 parts by weight of (co)polymer (B).

4. A lubricant for a thermoplastic resin according to claim 1, wherein a brittle temperature of (co)polymer (A) measured by differential scanning calorimetry is at least 0° C.

5. A lubricant for a thermoplastic resin according to claim 1, wherein both (co)polymer (A) and (co)polymer (B) are ones prepared by emulsion polymerization.

6. A thermoplastic resin composition comprising a thermoplastic resin and the lubricant for a thermoplastic resin according to claim 1.

7. A thermoplastic resin composition according to claim 6, wherein the thermoplastic resin is a poly(vinyl chloride) resin.

8. A lubricant according to claim 5 wherein the monomeric components of (co)polymer (B) are added to (co)polymer (A) emulsified in the emulsion polymerization medium within which (co)polymer A was prepared and are then (co)polymerized.

9. The lubricant according to claim 8, wherein the monomer or monomer mixture for (co)polymer (B) contains at least 45% of methyl methacrylate.

* * * * *